United States Patent [19]
Krishnan et al.

[11] Patent Number: 6,103,777
[45] Date of Patent: Aug. 15, 2000

[54] THERMOPLASTIC COMPOSITION SUITABLE FOR OPTICAL APPLICATIONS HAVING LOW HAZE VALUES

[75] Inventors: Sivaram Krishnan, Pittsburgh; Robert A. Pyles, Bethel Park; James B. Johnson, Washington, all of Pa.

[73] Assignee: Bayer Corporation, Pittsburgh, Pa.

[21] Appl. No.: 09/215,497

[22] Filed: Dec. 18, 1998

[51] Int. Cl.[7] ............................. C08L 69/00; C08L 67/04; A61K 31/135
[52] U.S. Cl. .......................... 523/105; 523/106; 524/238; 524/240; 524/600; 525/413; 525/415; 424/401; 424/653
[58] Field of Search ...................... 523/105, 106; 524/238, 240, 600; 525/413, 415; 424/401, 653

[56] References Cited

U.S. PATENT DOCUMENTS

| | | | |
|---|---|---|---|
| 4,698,347 | 10/1987 | Schaus et al. | 514/293 |
| 5,036,115 | 7/1991 | Gallas | 523/106 |
| 5,047,447 | 9/1991 | Gallas | 523/106 |
| 5,116,884 | 5/1992 | Gallas | 523/106 |

*Primary Examiner*—Andrew E. C. Merriam
*Attorney, Agent, or Firm*—Joseph C. Gil; Aron Preis

[57] ABSTRACT

A thermoplastic molding composition having low haze values, suitable for optical applications is disclosed. The compositions contains a resinous component selected from the group consisting of (i) a homogeneous blend of polycarbonate resin and polycaprolactone and (ii) a copoly (carbonate-lactone) block or random copolymer, and melanin in an amount of 0.1 to 1.0 parts per hundred parts of weight of the resinous component.

10 Claims, No Drawings

THERMOPLASTIC COMPOSITION SUITABLE FOR OPTICAL APPLICATIONS HAVING LOW HAZE VALUES

BACKGROUND OF THE DISCLOSURE

The present invention relates to thermoplastic molding compositions and, more particularly, to melanin containing compositions suitable for making optical lenses having low haze values.

In recent years, increasing attention has been given to the importance of protecting the eyes and skin from radiation emitted by artificial and natural light sources. Prolonged exposure of the eyes to reflected solar ultra-violet radiation is believed to result, for example, in the formation of cataracts and general tissue damage. Furthermore, attention has been given to the importance of protecting packaged material from such radiation to reduce the destabilization, degradation, decay or other undesirable effects on that material that may be caused by the radiation.

A variety of commercial optical filters have evolved to meet the threats posed by these radiation environments. Such optical absorption systems include sunglasses, contact lenses, aircraft and automobile windows, welders glasses and others.

In the case of sunglasses, two general types of materials are currently employed as practical absorbing components. Metallic films deposited onto plastic lens substrates are very effective sunscreens providing broad band attenuation of electromagnetic waves from the ultraviolet into the near infrared region of wavelengths. However, two disadvantages are associated with this type of sunglass system. Manufacturing steps beyond the formation of the basic plastic lens are required and, secondly, waves incident from the rear and reflected directly into the eye pose a new problem and require further manufacturing modifications.

Dyes and pigments comprise the second general class of optical absorbers. These molecular or polymeric elements are either deposited as thin films or are dispersed into the plastic matrix. U.S. Pat. No. 4,157,892 illustrates a method of coloring water-absorbable plastics. Disadvantages of this type of system are often the inability of the dye or pigment to absorb radiation sufficiently over all the ultraviolet wavelengths and a tendency to photodegrade. Photodegradation is particularly common to organic dyes and pigments.

Melanin is known for its use as a pigment to provide ultraviolet, visible and near infrared absorption properties to protective eye wear. The relevant art includes U.S. Pat. No. 4,698,374, which disclosed an optical lens system for radiation protection entailing a solid transparent substrate and melanin. In the examples, the melanin pigment has been incorporated into a lens system by polymerizing the melanin precursor simultaneously with a monomer, which is polymerized by free-radical polymerization. The monomers thus disclosed were diethylene glycol bis (allyl-carbonate), styrene and methyl methacrylate.

Also relevant are U.S. Pat. Nos. 5,116,884 and 5,047,447, which disclosed hydrophilic contact lens containing melanin. The melanin is incorporated into the lens by either adhering it to the surface of the lens or by incorporating it into the matrix of the lens. U.S. Pat. No. 5,036,115 disclosed melanin-containing, radiation-protective eyewear based on diethylene glycol bis-allyl carbonate and the procedure for its preparation.

The present invention relates to a novel molding composition containing polycarbonate resin, polycaprolactone and melanin. The composition, which is characterized by its low haze, is suitable in the preparation of lenses and in glazing applications. In addition, the impact performance of the inventive system is favorably comparable to that of polycarbonate. This advantageous impact performance sets the inventive composition apart from corresponding compositions, which are based on allyl resin and on glass. The thermoplastic molding composition of the present invention comprises polycarbonate resin (herein "PC"), polycaprolactone (herein "PCL") and melanin. Preferably, the composition contains at least about 5 percent of polycaprolactone (the indicated percents throughout the present text refer to percent relative to the total weight of polycarbonate and PCL) and melanin in an amount sufficient to render the composition practically haze-free. More preferably, the composition contains about 5 to 35% of PCL and 95 to 65% of polycarbonate and about 0.1 to 1.0 parts per hundred parts of resin (pphr) of melanin. Most preferably, PCL is present in an amount of 10 to 25%, PC is present in an amount of 75 to 90%, and the melanin is present in an amount of 0.1 to 0.5 pphr.

Polycaprolactone in the context of the invention is a polymeric resin having a weight average molecular weight of up to about 250,000, preferably 25,000 to 150,000, most preferably 30,000 to 100,000, the molecular structure of which contains units conforming to

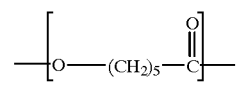

Suitable PCL are partially crystalline resins which are commercially available, such as from Union Carbide under the name Tone polymers P-767 and P-787. The PCL preferably has a reduced viscosity (measured with 0.2 g of polymer in 100 milliliter benzene at 30° C.) of about 0.1 to 1.5, more preferably about 0.5 to 0.9.

The PCL is a linear polyester formed through the ring opening reaction of ε-caprolactone.

Aromatic polycarbonates within the scope of the present invention are homopolycarbonates, copolycarbonates branched polycarbonate and mixtures thereof. The polycarbonates generally have a weight average molecular weight of 10,000 to 200,000, preferably 20,000 to 80,000 and their melt flow rate, per ASTM D-1238 at 300° C., is about 1 to about 65 g/10 min., preferably about 2 to 15 g/10 min. They may be prepared, for example, by the known diphasic interface process from a carbonic acid derivative such as phosgene and dihydroxy compounds by polycondensation (see German Offenlegungsschriften 2,063,050; 2,063,052; 1,570,703; 2,211,956; 2,211,957 and 2,248,817; French Patent 1,561,518; and the monograph H. Schnell, "Chemistry and Physics of Polycarbonates", Interscience Publishers, New York, N.Y., 1964, all incorporated herein by reference).

In the present context, dihydroxy compounds suitable for the preparation of the polycarbonates of the invention conform to the structural formulae (1) or (2).

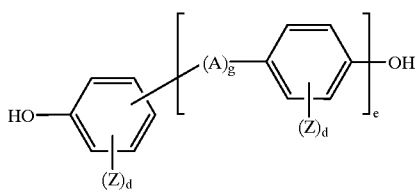

(1)

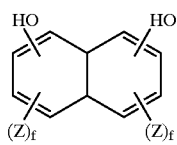

(2)

wherein

A denotes an alkylene group with 1 to 8 carbon atoms, an alkylidene group with 2 to 8 carbon atoms, a cycloalkylene group with 5 to 15 carbon atoms, a cycloalkylidene group with 5 to 15 carbon atoms, a carbonyl group, an oxygen atom, a sulfur atom, —SO— or —SO$_2$— or a radical conforming to

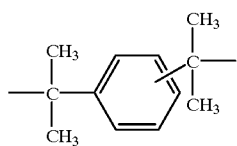

e and g both denote the number 0 to 1; Z denotes F, Cl, Br or C$_1$–C$_4$-alkyl and if several Z radicals are substituents in one aryl radical, they may be identical or different from one another; d denotes an integer of from 0 to 4; and f denotes an integer of from 0 to 3.

Among the dihydroxy compounds useful in the practice of the invention are hydroquinone, resorcinol, bis-(hydroxyphenyl)-alkanes, bis-(hydroxyphenyl)-ethers, bis-(hydroxyphenyl)-ketones, bis-(hydroxyphenyl)-sulfoxides, bis-(hydroxyphenyl)-sulfides, bis-(hydroxyphenyl)-sulfones, and α,α-bis-(hydroxyphenyl)-diisopropylbenzenes, as well as their nuclear-alkylated compounds. These and further suitable aromatic dihydroxy compounds are described, for example, in U.S. Pat. Nos. 3,028,356; 2,999,835; 3,148,172; 2,991,273; 3,271,367; and 2,999,846, all incorporated herein by reference.

Further examples of suitable bisphenols are 2,2-bis-(4-hydroxyphenyl)-propane (bisphenol A), 2,4-bis-(4-hydroxyphenyl)-2-methylbutane, 1,1-bis-(4-hydroxyphenyl)-cyclohexane, α,α'-bis-(4-hydroxyphenyl)-p-diisopropylbenzene, 2,2-bis-(3-methyl-4-hydroxyphenyl)-propane, 2,2-bis-(3-chloro-4-hydroxyphenyl)-propane, bis-(3,5-dimethyl-4-hydroxyphenyl)-methane, 2,2-bis-(3,5-dimethyl-4-hydroxyphenyl)-propane, bis-(3,5-dimethyl-4-hydroxyphenyl)-sulfide, bis-(3,5-dimethyl-4-hydroxyphenyl)-sulfoxide, bis-(3,5-dimethyl-4-hydroxyphenyl)-sulfone, dihydroxybenzophenone, 2,4-bis-(3,5-dimethyl-4-hydroxyphenyl)-cyclohexane, α,α'-bis-(3,5-dimethyl-4-hydroxyphenyl)-p-diisopropylbenzene, 2,2,4-trimethyl cyclohexyl 1,1-diphenol and 4,4'-sulfonyl diphenol.

Examples of particularly preferred aromatic bisphenols are 2,2-bis-(4-hydroxyphenyl)-propane, 2,2-bis-(3,5-dimethyl-4-hydroxyphenyl)-propane, 2,2,4-trimethyl cyclohexyl-1,1-diphenol and 1,1-bis-(4-hydroxyphenyl)-cyclohexane.

The most preferred bisphenol is 2,2-bis-(4-hydroxyphenyl)-propane (bisphenol A).

The polycarbonates of the invention may entail in their structure units derived from one or more of the suitable bisphenols.

An additional embodiment of the invention is represented by a composition wherein resinous components comprise copoly(carbonate-lactone) block or random copolymer. In this embodiment of the invention, the copolymer contains 1 to 50 mole % of units conforming to

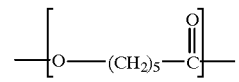

The preparation of such copolycarbonates is well known in the art.

Among the resins suitable in the practice of the invention are included phenolphthalein-based polycarbonate, copolycarbonates and terpolycarbonates such as are described in U.S. Pat. Nos. 3,036,036 and 4,210,741, both incorporated by reference herein.

The polycarbonates of the invention may also be branched by condensing therein small quantities, e.g., 0.05 to 2.0 mol % (relative to the bisphenols), of polyhydroxyl compounds. Polycarbonates of this type have been described, for example, in German Offenlegungsschriften 1,570,533; 2,116,974 and 2,113,374; British Patents 885,442 and 1,079,821 and U.S. Pat. No. 3,544,514. The following are some examples of polyhydroxyl compounds which may be used for this purpose: phloroglucinol; 4,6-dimethyl-2,4,6-tri-(4-hydroxyphenyl)-heptane; 1,3,5-tri-(4-hydroxyphenyl)-benzene; 1,1,1-tri-(4-hydroxyphenyl)-ethane; tri-(4-hydroxyphenyl)-phenylmethane; 2,2-bis-[4,4-(4,4'-dihydroxydiphenyl)]-cyclohexyl-propane; 2,4-bis-(4-hydroxy-1-isopropylidine)-phenol; 2,6-bis-(2'-dihydroxy-5'-methylbenzyl)-4-methylphenol; 2,4-dihydroxybenzoic acid; 2-(4-hydroxyphenyl)-2-(2,4-dihydroxyphenyl)-propane and 1,4-bis-(4,4'-dihydroxy-triphenylmethyl)-benzene. Some of the other polyfunctional compounds are 2,4-dihydroxybenzoic acid, trimesic acid, cyanuric chloride and 3,3-bis-(4-hydroxyphenyl)-2-oxo-2,3-dihydroindole.

In addition to the polycondensation process mentioned above, other processes for the preparation of the polycarbonates of the invention are polycondensation in a homogeneous phase and transesterification. The suitable processes are disclosed in the incorporated herein by reference, U.S. Pat. Nos. 3,028,365; 2,999,846; 3,153,008; and 2,991,273.

The preferred process for the preparation of polycarbonates is the interfacial polycondensation process.

Other methods of synthesis in forming the polycarbonates of the invention such as disclosed in U.S. Pat. No. 3,912,688, incorporated herein by reference, may be used.

Suitable polycarbonate resins are available in commerce, for instance, Makrolon FCR, Makrolon CD 2005, Makrolon 2600, Makrolon 2800 and Makrolon 3100, all of which are bisphenol based homopoly-carbonate resins differing in terms of their respective molecular weights and characterized in that their melt flow indices (MFR) per ASTM D-1238 are about 16.5 to 24, 13 to 16, 7.5 to 13.0 and 3.5 to 6.5 g/10 min., respectively. These are products of Bayer Corporation, of Pittsburgh, Pa.

A polycarbonate resin suitable in the practice of the invention is known and its structure and methods of preparation have been disclosed, for example in U.S. Pat. Nos. 3,030,331; 3,169,121; 3,395,119; 3,729,447; 4,255,556;

4,260,731; 4,369,303 and 4,714,746, all of which are incorporated by reference herein.

For the purpose of the present description, melanins are defined and classified as in the book entitles *Melamins*, by R. A. Nicolaus, published in 1968 by Hermann, 115, Boulevard Saint-Germain, Paris, France, which work in its entirety is incorporated herein by reference. As defined by Nicolaus, melanins constitute a class of pigments which are widespread in the animal and vegetable kingdoms. While the name melanin in Greek means black, not all melanins as pigments are black but may vary from brown to yellow. The melanins may be classified as follows: Eumelanins are derived from the precursor tyrosine (1):

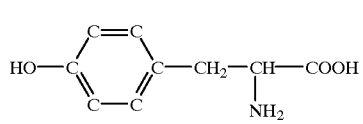

Phaeomelanins have as their precursors tyrosine and cysteine (2):

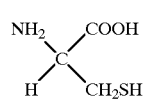

Allomelanins, the meaning of which is other melanins, are formed from nitrogen-free precursors, primary catechol and 1,8-dihydroxynapthalene. Further information on Melanins is found and incorporated herein by reference on page 827, Monograph No. 5629 in the Merck Index (10th Ed. 1983). Quinones are the usual intermediates in allomelanin synthesis. The synthesis of melanins occurs in nature. Furthermore, melanin may be synthesized commercially or in the laboratory. An example of the synthetically produced catechol melanin and DOPA melanin are found in the article by Froncisz, W., Sarna, T., Hyde, James S. Arch. Biochem. Biophys. "Copper (2+) ion Probe of Metal-ion Binding Sites in Melanin Using Electron Paramagnetic Resonance Spectroscopy." I. Synthetic Melanins. (1980, 202(1), 289–303). That article is incorporated herein by reference. The catechol melanin is disclosed in the Froncisz et al. article as being produced as follows:

Catechol Melanin. A solution of 15 g of catechol in 3 L of deionized water was brought to pH 8 with ammonium hydroxide, and then air was bubbled through the stirred solution for four days. The resulting melanin was precipitated by addition of concentrated hydrochloric acid to bring the pH to 2, then washed with dilute HCl and dialyzed against deionized water for several days to remove $H^+$ and $Cl^-$ ions, the concentration of the melanin suspension was estimated by drying an aliquot in vacuum over phosphorus pentoxide and weighing. Oxidized catechol melanin was prepared by adding 10 mL of $10^{-3}$M potassium ferricyanide to 30 mg of melamin and incubating for 10 minutes. The suspension was then spun down, washed twice with deionized water and suspended in 5 mL of deionized water.

Additional information relative to the preparation of suitable melanin may be found in U.S. Pat. No. 5,047,447 and the documents incorporated therein, all incorporated herein by reference.

The preparation of the inventive composition is conventional and may be carried out using conventional equipment and using procedures that are well known in the art of compounding thermoplastic molding compositions.

The inventive composition may be used in optical applications and radiation protection generally including sunglasses and filters.

The invention is further illustrated but is not intended to be limited by the following examples in which all parts and percentages are by weight unless otherwise specified.

EXAMPLES

EXPERIMENTAL

Compositions according to the invention were prepared and their properties determined. Articles molded of PCL are opaque and compositions containing only PCL and melanin are unsuitable for applications where transparency is a requirement.

The compositions, which were prepared and evaluated, as tabulated below contained Tone 767, a PCL product of Union Carbide, a resin characterized in that its weight average molecular weight is 50,000 g/mole). The polycarbonate was Makrolon 2408, a homopolymer based on bisphenol A, melt flow index of about 22 g/10 min., a product of Bayer Corporation. The Melanin used in the following examples was Catechol Melanin prepared by the oxidation of Catechol in acetonitrile. The table below summarizes the results.

|  | A | B | C | D |
|---|---|---|---|---|
| Polycarbonate, percent by weight (wt. %) | 100 15 | 100 | 85 | 85 |
| Polycaprolactone, wt. % | 0 | 0 | 15 |  |
| Melanin, pphr | 0 | 0.25 | 0 | 0.25 |
| Melt flow rate | 22.7 | 23.5 | 48.8 | 45.7 |
| Yellowness Index* | 1.95 | 52.56 | 3.92 | 57.92 |
| Haze, % | 0.37 | 5.01 | 1.01 | 1.89 |
| Total Light Transmittance, % | 90.62 | 55.02 | 89.80 | 52.37 |
| High Speed Impact** | 48.2 | 45.4 | 44.5 | 44.6 |

*in accordance with ASTM D 1925, specimen thickness 75 mils.
**4" x ⅛" Discs; High Speed Impact per ASTM D-3763-86 @ 50% humidity, 23° C.

Melt flow rate has been determined in accordance with ASTM D-1238 of about 20 g/10 min.

The results show the effectiveness of melanin to render the composition suitable for optical applications.

Although the invention has been described in detail in the foregoing for the purpose of illustration, it is to be understood that such detail is solely for that purpose and that variations can be made therein by those skilled in the art without departing from the spirit and scope of the invention except as it may be limited by the claims.

What is claimed is:

1. A thermoplastic molding composition comprising
   (A) a resinous component selected from the group consisting of
      (i) a homogeneous blend of polycarbonate resin and polycaprolactone and
      (ii) a copoly(carbonate-lactone) block or random copolymer, and
   (B) melanin in an amount of 0.1 to 1.0 parts per hundred parts of weight of said (A).
2. The thermoplastic molding composition of claim 1 wherein said (ii) contains 1 to 50 mole % of units conforming to

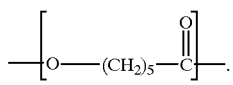

3. The thermoplastic molding composition of claim 1 wherein blend contains about 5 to 35 percent polycaprolactone, relative to the total weight of polycarbonate and polycaprolactone.

4. The thermoplastic molding composition of claim 3 wherein polycaprolactone has a weight average molecular weight of 25,000 to 150,000.

5. The thermoplastic molding composition of claim 3 wherein polycarbonate has a weight average molecular weight of 10,000 to 200,000.

6. The thermoplastic molding composition of claim 1 wherein melanin is eumelanin.

7. The thermoplastic molding composition of claim 1 wherein melanin is phaeomelanin.

8. The thermoplastic molding composition of claim 1 wherein melanin is catechol melanin.

9. The thermoplastic molding composition of claim 1 wherein melanin is present in an amount of 0.1 to 0.5 pphr.

10. The thermoplastic molding composition of claim 1 wherein blend contains about 10 to 25 percent polycaprolactone, relative to the total weight of polycarbonate and polycaprolactone.

* * * * *